US006212436B1

(12) United States Patent
Marple et al.

(10) Patent No.: US 6,212,436 B1
(45) Date of Patent: Apr. 3, 2001

(54) DYNAMIC INHERITANCE OF SOFTWARE OBJECT SERVICES

(75) Inventors: Kirk J. Marple, Redmond; Manny Vellon; Steven M. Drucker, both of Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/028,418

(22) Filed: Feb. 24, 1998

(51) Int. Cl.$^7$ .............................. G05B 15/02; G05B 19/18
(52) U.S. Cl. ............................ 700/10; 700/181; 700/266; 700/267; 700/268; 700/269; 700/270; 700/271; 700/272; 700/273; 700/274; 345/339; 345/433; 345/440; 345/352; 707/1; 707/102
(58) Field of Search .................... 700/181, 10, 266–284; 345/339, 433, 440, 352; 707/102, 1

(56) References Cited

U.S. PATENT DOCUMENTS

| | | | |
|---|---|---|---|
| 5,425,137 | * | 6/1995 | Monhan et al. ...................... 345/433 |
| 5,606,705 | * | 2/1997 | Randall et al. ...................... 709/203 |
| 5,652,789 | * | 7/1997 | Miner et al. ......................... 379/201 |
| 5,682,528 | * | 10/1997 | Baker et al. ............................... 713/1 |
| 5,745,115 | * | 4/1998 | Purple et al. ......................... 345/352 |
| 5,764,639 | * | 6/1998 | Staples et al. ....................... 358/296 |
| 5,776,057 | * | 7/1998 | Swenson et al. .................... 600/301 |
| 5,777,616 | * | 7/1998 | Bates et al. .......................... 345/339 |
| 5,808,612 | * | 9/1998 | Merrick et al. ...................... 345/351 |
| 5,953,017 | * | 9/1999 | Beach et al. ......................... 345/440 |
| 5,977,985 | * | 11/1999 | Ishii et al. ............................ 345/433 |
| 6,049,805 | * | 3/2000 | Drucker et al. ..................... 707/102 |

* cited by examiner

Primary Examiner—William A. Cuchlinski, Jr.
Assistant Examiner—McDieunel Marc
(74) Attorney, Agent, or Firm—Ipsolon LLP

(57) ABSTRACT

Object services like methods or properties are provided to or inherited by objects dynamically during run-time. In one method of providing dynamic inheritance, hierarchical relationships are defined between multiple objects such that each object references or is referenced by another object. A call is made for a particular service (e.g., a method or property) at a selected object. The service is provided directly from the object whenever the service is available therefrom. Whenever the selected service is unavailable at the selected object, the call is passed to a hierarchically superior object. Another aspect of dynamic inheritance is that an object, such as the root object, may include one or more methods for adding or otherwise changing the methods or properties available from that object.

25 Claims, 4 Drawing Sheets

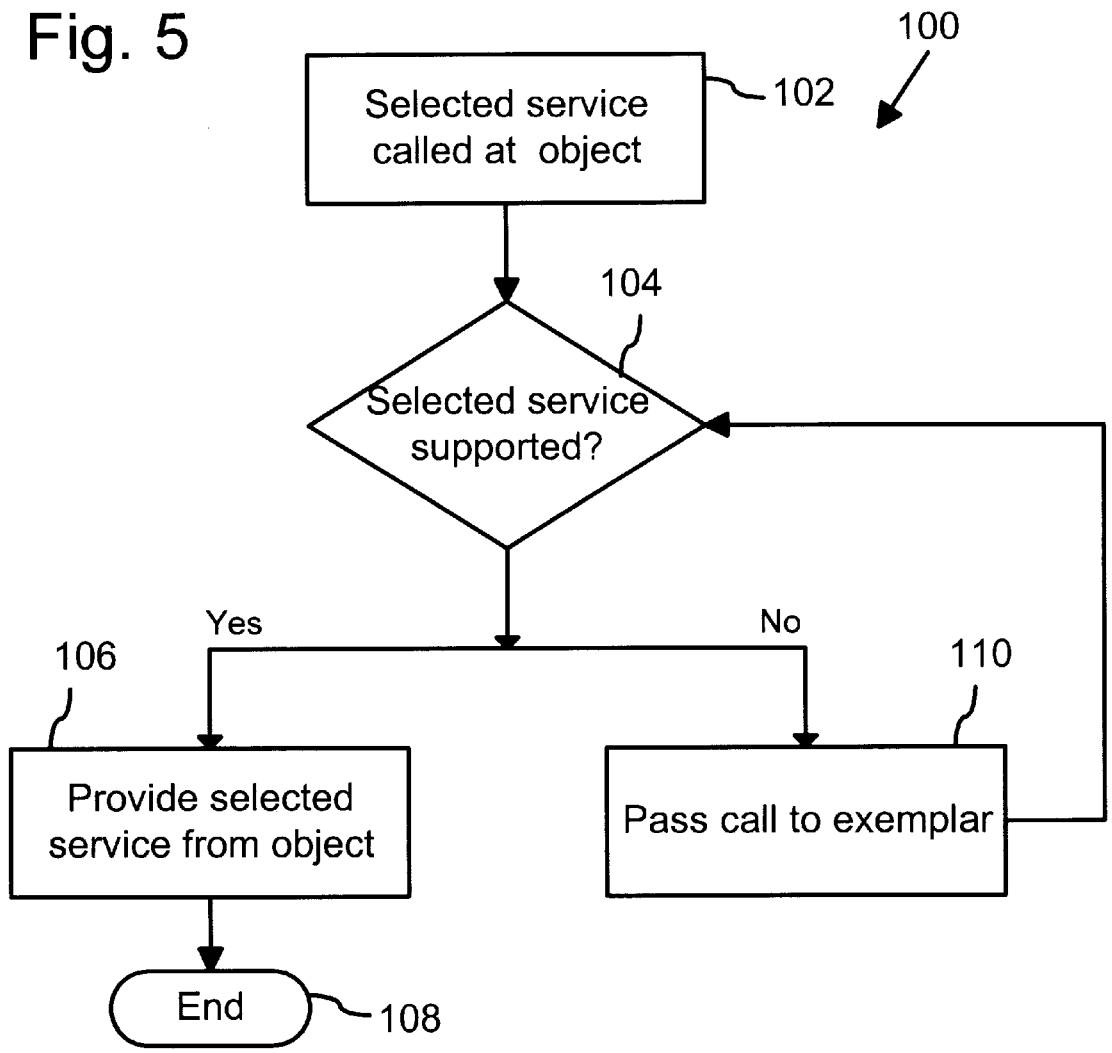

ID ITANCE OF SOFTWARE
OBJECT SERVICES

FIELD OF THE INVENTION

The present invention relates to software objects and, in particular, to changing the services (e.g., methods or properties) that are available to such objects dynamically during run-time.

BACKGROUND AND SUMMARY OF THE INVENTION

A conventional interfaced software object provides software services, such as methods or properties, that are accessed by one or more interfaces. A method is typically a function or procedure that performs a specific action and is called via a corresponding interface. A property is typically information or data and is also called via a corresponding interface. Objects are commonly implemented in a server that, for example, may be a dynamic link library utilized by a software program or may be an entirely separate executable process.

Conventional objects include the characteristic of interface inheritance in which the definitions of the methods that an interface supports may be inherited by another interface. The interfaces may be of different objects that may or may not be of the same class of objects. An object supporting an inherited interface can be treated like the object from which the interface is inherited. Such objects may be implemented by or in accordance with many object-oriented programming tools or models including, for example, the component object model (COM).

An interface of an object may not be changed once the design and implementation of the interface is complete and the object is established, distributed, or promulgated for general run-time use. Adding new services to or modifying existing services in such an object requires that a new interface be defined in a design-time operation. The new interface would then be distributed or promulgated for general run-time use. The new interface may inherit services from an existing interface, but the new interface remains distinct and has a unique identifier. Despite interface inheritance, therefore, interfaces remain static once they have been established, distributed, or promulgated for use at run-time.

While providing stability and predictability in the use of objects, the static nature of interface services at run-time limits the flexibility of object interfaces. In some applications the lack of flexibility in interface definitions can pose an undesirable limitation. An example of such an application is an interactive virtual world environment that represents a real or imaginary place using graphic and audio data for presenting the place to a computer user and allowing the user to interact with it.

Objects with conventional static interfaces can be used to provide users of a virtual world environment with a pre-defined environment with which the user can interact. A disadvantage with objects having conventional static interfaces in such an environment is that changes to the environment cannot be made at run-time. Changes must be made by adding interfaces in a design-time operation. This restricts the level of interaction or control that users can have with or over the environment.

In accordance with the present invention, therefore, object services like methods or properties are provided to or inherited by objects dynamically during run-time. This dynamic inheritance may be provided within the context of an object model, such as the Component Object Model, that supports only design-time interface inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

Another aspect of dynamic inheritance is that an object model interface may include one or more methods for adding or otherwise changing the methods or properties available from that interface. The changes in the methods or properties may be made at run-time, after the interface has been otherwise fixed or established.

In one implementation, the interface includes an AddMethod method that adds a designated method to the interface at run-time to make the method available from the interface. Similarly, the interface includes an AddProperty method that adds a designated property to a designated interface at run-time to make the property available from the interface. An InvokeMethod method allows a user to execute the designated method, and other methods can allow other access to and control over the methods and properties. Methods and properties available for implementation or access by these dynamic inheritance methods may be in a dynamic inheritance listing, such as a table, that indicates the names of the methods and properties, defines the services they provide, and includes unique identifiers for them.

Additional objects and advantages of the present invention will be apparent from the detailed description of the preferred embodiment thereof, which proceeds with reference to the accompanying drawings.

BRIEF DESCRIPTION OF THE DRAWINGS

FIG. 5 is a flow diagram illustrating a hierarchical inheritance process.

DETAILED DESCRIPTION OF PREFERRED EMBODIMENT

Figure 1:
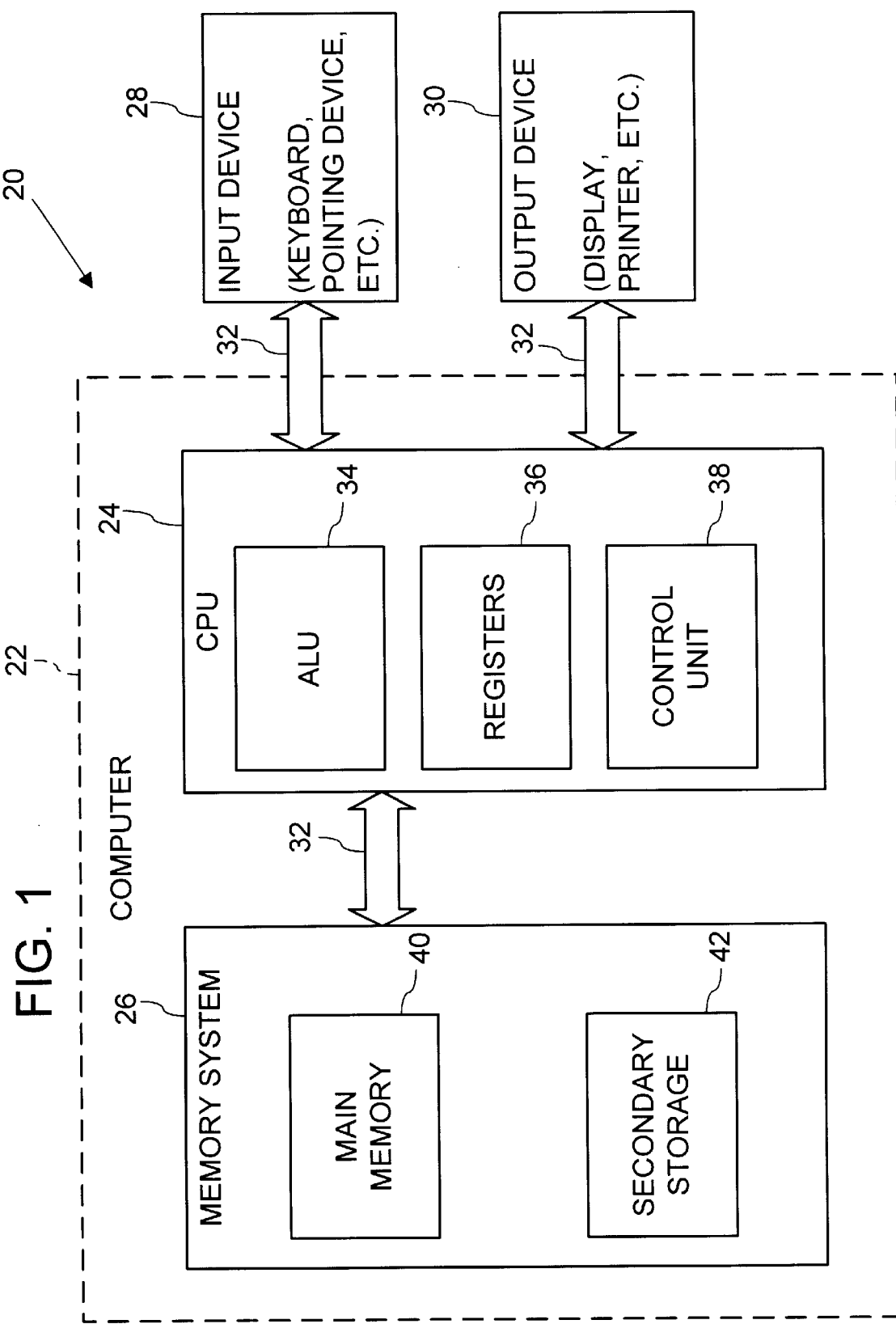
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
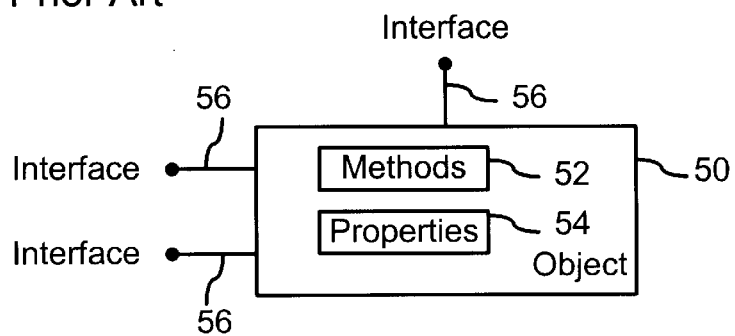
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 SO each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
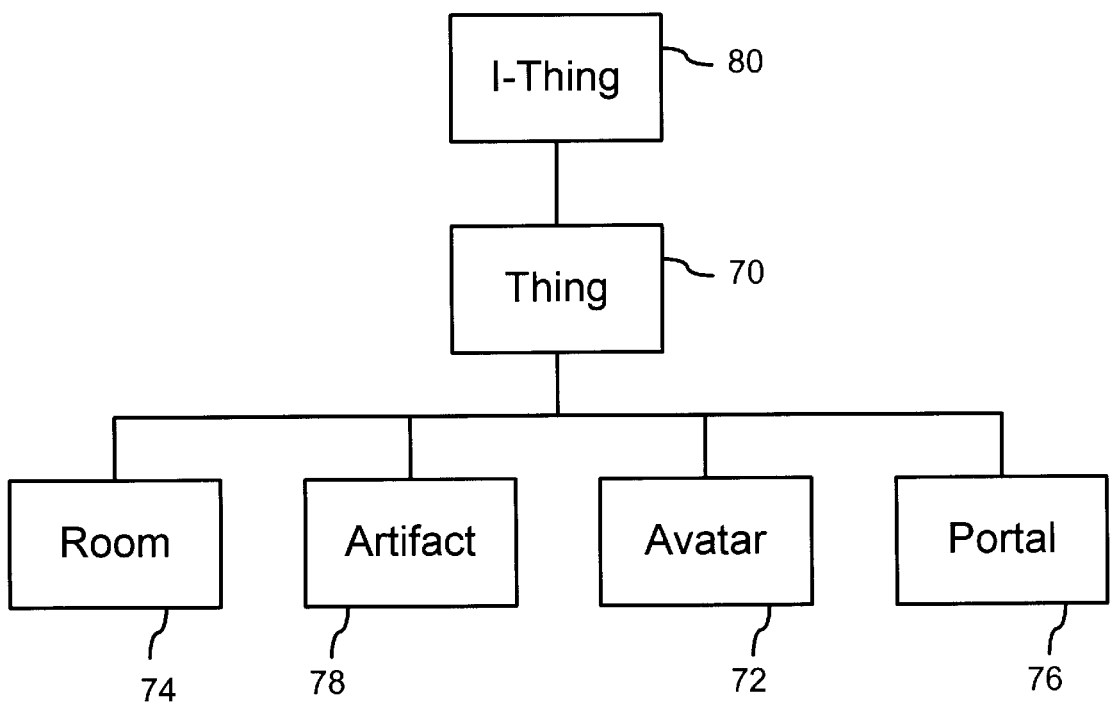
FIG. 3 is a block diagram representing hierarchical inheritance relationships between an exemplary set of objects.

FIG. 3 is a block diagram illustrating hierarchical inheritance relationships between an exemplary set of objects 70–78 representing abstractions that include data and operations associated with that data according to the present invention. For purposes of illustration, objects 70–78 will be discussed with reference to a representation of a virtual world environment or domain. The virtual world environment represents a real or imaginary place using graphic and audio data that are presented to a computer user. Objects 70–78 are of an interactive virtual world environment object (not shown) and correspond to particular types of entities or articles within the environment. It will be appreciated, however, that this illustration does not limit the applicability of dynamic inheritance between objects to a virtual world environment and that dynamic inheritance of this invention can be used with objects and objects for other representations, models, or schemes.

Objects 70–78 are the basic objects from which other objects inherit services and are called the exemplars for the virtual world environment or representation. Object 70

(designated Thing) is the root or core of the set of all objects in the representation. Object 72 (designated Avatar) represents an avatar corresponding to a real person (e.g., the user) or a virtual person in the world. Object 74 (designated Room) and object 76 (designated Portal) represent and define the topology of the world as locations (i.e. rooms) and passageways (i.e., portals) between the rooms. Object 78 (designated Artifact) represents articles that are or may be manipulated by any of users via their avatars. Objects 70–78 are based upon an interface 80 (designated I-Thing) that in one implementation is a COM object interface. It will be appreciated, however, that I-Thing interface 80 could alternatively be implemented according to other object models.

Figure 4:
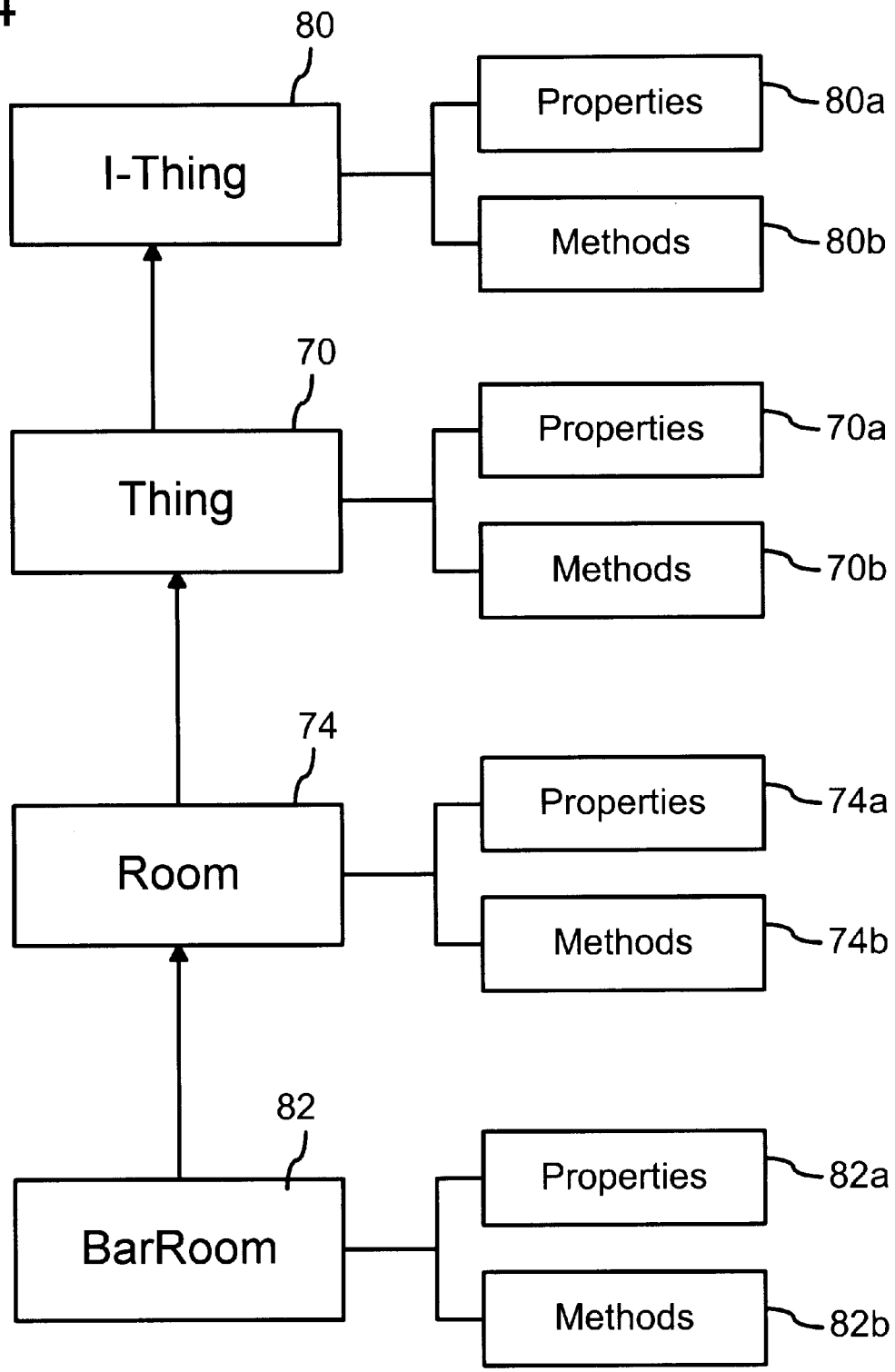
FIG. 4 is a block diagram illustrating a sequence of hierarchical inheritance relationships.

FIG. 4 is block diagram illustrating a sequence of hierarchical inheritance relationships between Thing object 70, exemplar Room object 74, and one example of a particular room object 82 designated BarRoom. Objects 70, 74, and 82 include the characteristics described with reference to interfaces 56 of object 50 which characteristics are represented as properties 70a, 74a, and 82a and methods 70b, 74b, and 82b, respectively. Thing object 70 is the root or parent exemplar of the set of objects and is the direct exemplar to Room object 72. Room object 72 is the direct exemplar to BarRoom object 82, which represents a particular room in the virtual world environment.

I-Thing interface 80 defines properties 80a and methods 80b, as described below in greater detail, that are available to all objects 70–78 and 82. Thing object 70 defines properties 70a and methods 70b shared by all other objects in the representation or virtual world environment, including exemplars 72–78 and particular object 82. Properties 70a include for a particular object an exemplar property that refers to the exemplar or parent of the particular object, a name property that lists the name of the particular object, and a description property that includes a text description of the particular object.

Properties 70a also include a geometry property that associates a geometric model for representing the object, a location property that defines a location object in the virtual world environment with or in which the particular object is positioned, a contents property that lists objects "contained" by the particular object, and an owner property that identifies a user that the "owns" the particular object.

As utilized in the exemplary virtual world environment, methods 70b include a MoveTo method for changing the room the particular object is in and a Tell method by which one object passes information to another. It will be appreciated, however, that other methods particular to a virtual world environment could be included in methods 70b and that different applications could use entirely different methods.

Room object 74 defines additional properties 74a and methods 74b shared by lower level objects in the virtual world environment, including object 82. Properties 74a include for a particular object an exit property indicating an exit from the room and an entrance property indicating an entrance into the room. Methods 74b include an announce method for broadcasting information to others in the room. BarRoom object 82 defines properties 82a and methods 82b, including a bartender property designating an avatar for hosting the room, a recipes property designating refreshments available in the room, an orderdrink method by which a user requests a refreshment from the bartender, and a requestmusic method by which a user requests a music selection.

Properties and methods are associated with objects during a design time phase when a developer creates them. The objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

FIG. 5 is a flow diagram illustrating a dynamic inheritance process 100 as a run-time use of objects. For purposes of illustration, dynamic inheritance process 100 is described with reference to the sequence of hierarchical inheritance relationships shown in FIG. 4.

Process block 102 indicates that a reference or call is made to a selected service (e.g., a property or a method) at a selected object (e.g., object 82), thereby making the selected object the current object. The reference or call may be made in the conventional manner that properties and methods of an object are referred to or called.

Query block 104 represents a query as to whether the current object receiving the reference or call (e.g., object 82) supports the selected property or method. Whenever the current object (e.g., object 82) supports the selected property or method, query block proceeds to process block 106. Otherwise, query block 104 proceeds to process block 110.

Process block 106 indicates that the selected property or method is provided by the current object. Process block 106 proceeds to termination block 108.

Process block 110 indicates that the reference or call to the selected property or method is passed to the direct exemplar of the current object (e.g., object 74) and the direct exemplar is redesignated the current object. Process block 110 returns to query block 104.

Process 100 provides a mechanism for dispatching properties and methods to exemplars. Process 100 supports dynamic inheritance of other properties and methods at run-time by allowing intervening exemplars to be added to a hierarchy of objects.

In one implementation I-Thing interface 80 also defines, supports, or implements methods 80b that include the dynamic inheritance methods set forth in Table 1. Methods 80b in Table 1 are available to each object of which I-Thing interface 80 is the root exemplar (e.g. objects 72–78).

TABLE 1

| Name | Action |
|---|---|
| AddMethod | Adds a designated method to make the method available to the object |
| RemoveMethod | Removes a designated method to make the method unavailable to the object |
| AddProperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |
| PutProperty | Puts a designated value or designated values in the parameters of a designated property |
| InvokeMethod | Invokes a designated method |

For example, methods and properties available for implementation or access by the dynamic inheritance methods of I-Thing interface 80 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method.

The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 100 of FIG. 5, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular object according to dynamic inheritance process 100. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 100 of FIG. 5 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 80 after it has been established is a major improvement upon the prior functionality of objects with fixed interfaces (e.g., COM objects) like the IDispatch interface.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer-readable medium having stored thereon interfaced software objects with services that include methods or properties, the improvement comprising:

indications of hierarchical relationships between the objects such that each object references or is referenced by another object;

software instructions for determining in response to a call to a selected service at a selected object whether the selected service is available from the object; and software instructions for passing the call to a referenced object that is referenced by the selected object if the selected service is unavailable at the selected object.

2. The computer-readable medium of claim 1 further comprising:

software instructions for determining in response to a call to a selected service passed to a referenced object whether the selected service is available from the referenced object; and software instructions for passing the call to successive other referenced objects if the selected service is unavailable at one or more previously referenced objects.

3. The computer-readable medium of claim 1 further comprising software instructions for adding a service to a referenced object.

4. The computer-readable medium of claim 3 further comprising software instructions for invoking the service added to the referenced object.

5. The computer-readable medium of claim 4 further comprising software instructions for obtaining information regarding the service added to the referenced object.

6. The computer-readable medium of claim 4 further comprising software instructions for assigning a parameter to the service added to the referenced object.

7. The computer-readable medium of claim 1 in which the objects include a root object that is referenced by at least one other object, but does not reference another object, and the medium further comprises software instructions for adding a service to the root object.

8. The object of claim 1 further comprising a run-time RemoveMethod method that removes at run-time availability to a designated method via the interface.

9. The object of claim 1 further comprising an AddProperty method that adds at run-time availability to a designated property via the interface.

10. The object of claim 9 further comprising a run-time RemoveProperty method that removes at run-time availability to a designated property via the interface.

11. A computer-readable medium having stored thereon software instructions for utilizing software objects with services that include methods or properties, comprising:

software instructions for adding a designated method at run-time to a designated object to make the method available via the object, the designated object being referenced by at least one other object, but not referencing another object, and each of the other objects referencing or being referenced by another object in a hierarchical relationship of multiple levels.

12. The medium of claim 11 further comprising software instructions for removing at run-time availability to a designated method via the object.

13. The medium of claim 11 further comprising software instructions for adding at run-time availability to a designated property via the object.

14. The medium of claim 11 further comprising software instructions for removing at run-time availability to a designated property via the object.

15. In a computer system utilizing interfaced software objects with plural objects that provide services including methods or properties, a run-time inheritance method for accessing services, comprising:

defining hierarchical relationships between the objects such that each object references or is referenced by another object; and in response to a call to a selected service at a selected object, providing the service from the object if the service is available therefrom or passing the call to a referenced object that is referenced by the selected object if the selected service is unavailable at the selected object.

16. The method of claim 15 further comprising:

determining in response to a call to a selected service passed to a referenced object whether the selected service is available from the object; and passing the call to successive other referenced objects if the selected service is unavailable at one or more previously referenced objects.

17. The method of claim 15 in which the objects include a root object that is referenced by at least one other object, but does not reference another object, and the referenced object is the root object.

18. The method of claim 15 further comprising adding a service to a referenced object.

19. The method of claim 18 further comprising invoking the service added to the referenced object.

20. The method of claim 15 in which the objects include a root object that is referenced by at least one other object, but does not reference another object, and the method further comprises adding a service to the root object.

21. In a computer-readable medium having stored thereon software objects with services that include methods or properties, the improvement comprising:

indications of hierarchical relationships between the objects such that each object references or is referenced by another object;

software instructions for determining in response to a call to a selected service at a selected object whether the selected service is available from the object; and software instructions for passing the call to a referenced object that is referenced by the selected object if the selected service is unavailable at the selected object, the objects including a root object that is referenced by at least one other object, but does not reference another object, the referenced object being the root object.

22. The computer-readable medium of claim 21 further comprising software instructions for adding a service to a referenced object.

23. The computer-readable medium of claim 22 further comprising software instructions for invoking the service added to the referenced object.

24. The computer-readable medium of claim 22 further comprising software instructions for obtaining information regarding the service added to the referenced object.

25. The computer-readable medium of claim 22 further comprising software instructions for assigning a parameter to the service added to the referenced object.

* * * * *